US012215977B2

(12) United States Patent
Faustino et al.

(10) Patent No.: US 12,215,977 B2
(45) Date of Patent: Feb. 4, 2025

(54) LOCALIZATION USING INTERNET OF THINGS DEVICES

(71) Applicant: T-Mobile USA, Inc., Bellevue, WA (US)

(72) Inventors: Narciso Faustino, McKinney, TX (US); Kevin Hinson, Seattle, WA (US); Jie Hui, Mercer Island, WA (US); Antoine Tran, Bellevue, WA (US); Bryan Yang, Seattle, WA (US); Doru Culiac, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 70 days.

(21) Appl. No.: 17/225,841

(22) Filed: Apr. 8, 2021

(65) Prior Publication Data

US 2021/0325189 A1    Oct. 21, 2021

Related U.S. Application Data

(60) Provisional application No. 63/012,594, filed on Apr. 20, 2020.

(51) Int. Cl.
*G01C 21/20* (2006.01)
*G01C 21/00* (2006.01)
(Continued)

(52) U.S. Cl.
CPC ......... *G01C 21/206* (2013.01); *G01C 21/383* (2020.08); *G16Y 20/10* (2020.01); *G16Y 40/60* (2020.01)

(58) Field of Classification Search
None
See application file for complete search history.

(56) References Cited

U.S. PATENT DOCUMENTS

| 8,526,368 | B2 | 9/2013 | Finlow-Bates et al. |
| 8,559,975 | B2 | 10/2013 | Lin et al. |

(Continued)

FOREIGN PATENT DOCUMENTS

| CA | 3065721 A1 * | 1/2018 | ........... G01C 21/206 |
| EP | 1115262 A1 | 7/2001 | |
| GB | 2574602 A * | 12/2019 | ........... G01C 21/206 |

OTHER PUBLICATIONS

Pradhan, et al., "(Stable) virtual landmarks: Spatial dropbox to enhance retail experience", 2014 Sixth International Conference on Communication Systems and Networks (COMSNETS), Bangalore, 2014, pp. 1-8.
(Continued)

*Primary Examiner* — Tuan C To
*Assistant Examiner* — David Ruben Pedersen

(57) ABSTRACT

Techniques are disclosed for locating a user device in an indoor environment such as a building based at least on a building topology model using one or more Internet of Things (IoT) devices. Certain aspects of the techniques include detecting a presence of a user device in communication with an IoT device in a building, wherein the IoT device is associated with device attributes. The building is identified based at least on a building topology model that is associated with the building and the device attributes. The location of the IoT device is determined based at least on the building topology model. The user device is located relative to the location of the IoT device.

20 Claims, 5 Drawing Sheets

(51) Int. Cl.
  *G16Y 20/10* (2020.01)
  *G16Y 40/60* (2020.01)

(56) References Cited

U.S. PATENT DOCUMENTS

| | | | |
|---|---|---|---|
| 9,301,100 | B1 | 3/2016 | Jampani et al. |
| 10,176,718 | B1 | 1/2019 | Mazuir et al. |
| 11,069,082 | B1 | 7/2021 | Afrouzi et al. |
| 2008/0281839 | A1* | 11/2008 | Bevan .................. G06F 16/29 |
| 2012/0072110 | A1 | 3/2012 | Venkatraman |
| 2012/0136623 | A1 | 5/2012 | Edge et al. |
| 2012/0149388 | A1 | 6/2012 | West et al. |
| 2012/0224770 | A1 | 9/2012 | Strassenburg-Kleciak |
| 2014/0244163 | A1 | 8/2014 | Zhao et al. |
| 2014/0274151 | A1 | 9/2014 | Pattabiraman et al. |
| 2015/0043325 | A1 | 2/2015 | Tsukamoto et al. |
| 2015/0296473 | A1* | 10/2015 | Chan ................. H04W 64/00 455/456.1 |
| 2016/0127209 | A1* | 5/2016 | Singh ................ H04L 43/065 455/435.2 |
| 2016/0302050 | A1 | 10/2016 | Blando et al. |
| 2016/0345129 | A1* | 11/2016 | Lee ..................... G01S 5/0236 |
| 2017/0013409 | A1 | 1/2017 | Cerchio et al. |
| 2017/0234962 | A1* | 8/2017 | Yang ................. G01S 5/02524 342/465 |
| 2017/0300973 | A1 | 10/2017 | Jones et al. |
| 2017/0318422 | A1 | 11/2017 | Kokkonen |
| 2017/0366943 | A1 | 12/2017 | Yoon et al. |
| 2018/0091946 | A1 | 3/2018 | Venkatraman et al. |
| 2018/0109921 | A1 | 4/2018 | Cerchio et al. |
| 2018/0180706 | A1 | 6/2018 | Li et al. |
| 2018/0375945 | A1 | 12/2018 | Bratsman et al. |
| 2019/0072390 | A1* | 3/2019 | Wang ................. G06K 7/10386 |
| 2019/0182627 | A1* | 6/2019 | Thoresen .............. H04L 63/045 |
| 2019/0236732 | A1* | 8/2019 | Speasl .................. H04W 4/024 |
| 2019/0375094 | A1 | 12/2019 | Kim et al. |
| 2020/0018812 | A1 | 1/2020 | Lindquist et al. |
| 2020/0228943 | A1 | 7/2020 | Martin et al. |
| 2021/0063163 | A1 | 3/2021 | Huberman et al. |
| 2021/0279417 | A1* | 9/2021 | Delaney ................. G06F 40/30 |

OTHER PUBLICATIONS

Davidson, P. and R. Piche, "A Survey of Selected Indoor Positioning Methods for Smartphones," IEEE Communications Surveys & Tutorials, 2016, 24 pages. https://tutcris.tut.fi/portal/files/11073461/main_2_column.pdf.

Jang, Beakcheol and Hyunjung Kim, "Indoor Positioning Technologies Without Offline Fingerprinting Map: A Survey," IEEE Communications Surveys & Tutorials ( vol. 21,Issue: 1, Firstquarter 2019), 21 pages. https://ieeexplore.ieee.org/abstract/document/8451859.

Anglois, et al., "Indoor Localization with Smartphones: Harnessing the Sensor Suite in Your Pocket," IEEE Consumer Electronics Magazine ( vol. 6, Issue: 4, Oct. 2017), 1 page. https://ieeexplore.ieee.org/document/8048717.

Simultaneous localization and mapping (2020), 8 pages. https://en.wikipedia.org/wiki/Simultaneous_localization_and_mapping.

Jiang, et al.,. "Autonomous Robotic Monitoring of Underground Cable Systems," 12th International Conference on Advanced Robotics, Sep. 2005, pp. 673-679.

Sen, et al., "Avoiding multipath to revive inbuilding WiFi localization," ACM MobiSys 2013, 14 pages.

Laput, et al., "EMSense: Touch Recognition of Uninstrumented, Electrical and Electromechanical Objects," ACM User Interface Software and Technology Symposium, Nov. 8-11, 2015, 10 pages.

Roy, et al., "I am a smartphone and I can tell my user's walking direction", ACM MobiSys 2014, 14 pages.

Li, et al., "ID-Match: A Hybrid Computer Vision and RFID System for Recognizing Individuals in Groups," ACM Conference on Human Factors in Computing Systems (CHI), May 7-12, 2016, 12 pages.

Li, et al., "IDSense: A Human Object Interaction Detection System Based on Passive UHF RFID," ACM Conference on Human Factors in Computing Systems (CHI), Apr. 18-24, 2015, 10 pages.

Shu, et al., "Last-Mile Navigation Using Smartphones," ACM MobiCom 2018, 13 pages.

Wang, et al., "No need to war-drive: unsupervised indoor localization," ACM MobiSys 2012, 14 pages.

Mariakakis, et al., "Sail: Single access point-based indoor localization," ACM MobiSys 2014, 14 pages.

Pradhan, et al, "Smartphone-based Acoustic Indoor Space Mapping," Proc. ACM Interact. Mob. Wearable Ubiquitous Technol. 2, 2, Article 75 (Jun. 2018), 26 pages.

Wang, et al., "Indoor-Outdoor Detection Using a Smart Phone Sensor," Sensors (Basel). Oct. 2016; 16(10): 1563, 24 pages. https://www.ncbi.nlm.nih.gov/pmc/articles/PMC5087352/.

U.S. Appl. No. 17/074,279, Office Action mailed Nov. 17, 2021, 80 pages.

U.S. Appl. No. 17/183,715, Office Action mailed Jan. 4, 2022, 27 pages.

U.S. Appl. No. 17/192,382, Final Office Action mailed Aug. 4, 2022, 39 pages.

U.S. Appl. No. 17/074,279, Final Office Action mailed Apr. 20, 2022, 76 pages.

U.S. Appl. No. 17/074,279, Notice of Allowance mailed Jun. 21, 2022, 87 pages.

U.S. Appl. No. 17/074,279, Supplemental Notice of Allowance mailed Jul. 6, 2022, 10 pages.

U.S. Appl. No. 17/183,715, Notice of Allowance mailed May 4, 2022, 18 pages.

U.S. Appl. No. 17/183,715, Notice of Allowance mailed Jun. 13, 2022, 17 pages.

U.S. Appl. No. 17/192,382, Office Action mailed May 24, 2022, 42 pages.

U.S. Appl. No. 17/074,279, Office Action mailed Nov. 10, 2011, 97 pages.

U.S. Appl. No. 17/192,382, Office Action mailed Dec. 8, 2022, 47 pages.

U.S. Appl. No. 17/192,382, Notice of Allowance mailed Apr. 13, 2023, 44 pages.

U.S. Appl. No. 17/225,937, Office Action mailed Feb. 3, 2023, 66 pages.

U.S. Appl. No. 17/967,798, Notice of Allowance mailed Apr. 13, 2023, 27 pages.

U.S. Appl. No. 17/074,279, Notice of Allowability mailed Jul. 20, 2023, 72 pages.

U.S. Appl. No. 17/192,382, Notice of Allowance mailed Jul. 11, 2023, 47 pages.

U.S. Appl. No. 17/192,382, Notice of Allowance mailed May 30, 2023, 45 pages.

U.S. Appl. No. 17/225,937, Final Office Action mailed Aug. 17, 2023, 33 pages.

U.S. Appl. No. 17/967,798, Notice of Allowance mailed Jul. 20, 2023, 20 pages.

U.S. Appl. No. 17/225,937, Office Action mailed Dec. 14, 2023, 16 pages.

\* cited by examiner

LOCALIZATION USING INTERNET OF THINGS DEVICES

CROSS-REFERENCE TO RELATED PATENT APPLICATION

This application claims priority to U.S. Provisional Patent Application No. 63/012,594, filed on Apr. 20, 2020, and entitled "Localization Using IoT Devices," which is hereby incorporated by reference in its entirety.

BACKGROUND

In many indoor locations such as commercial buildings, where there is a lack of signal and/or building penetration, or in Global Positioning System (GPS)-denied areas, accurate localization of user devices is generally not feasible. As a result, the location information of a user device may be tracked in outdoor locations and then no longer monitored once the user device enters a building or other indoor environments. Another challenge of indoor localization is navigating within the complexity of indoor environments and detailed interior building structures of various buildings. For instance, while multiple buildings may appear similar in structure from the exterior, the buildings may greatly differ in floorplans and layouts. Thus, accessing one point such as an entrance of one building may be different from accessing another entrance of a different building even if the two entrances may be situated similarly on the two buildings from the outside.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
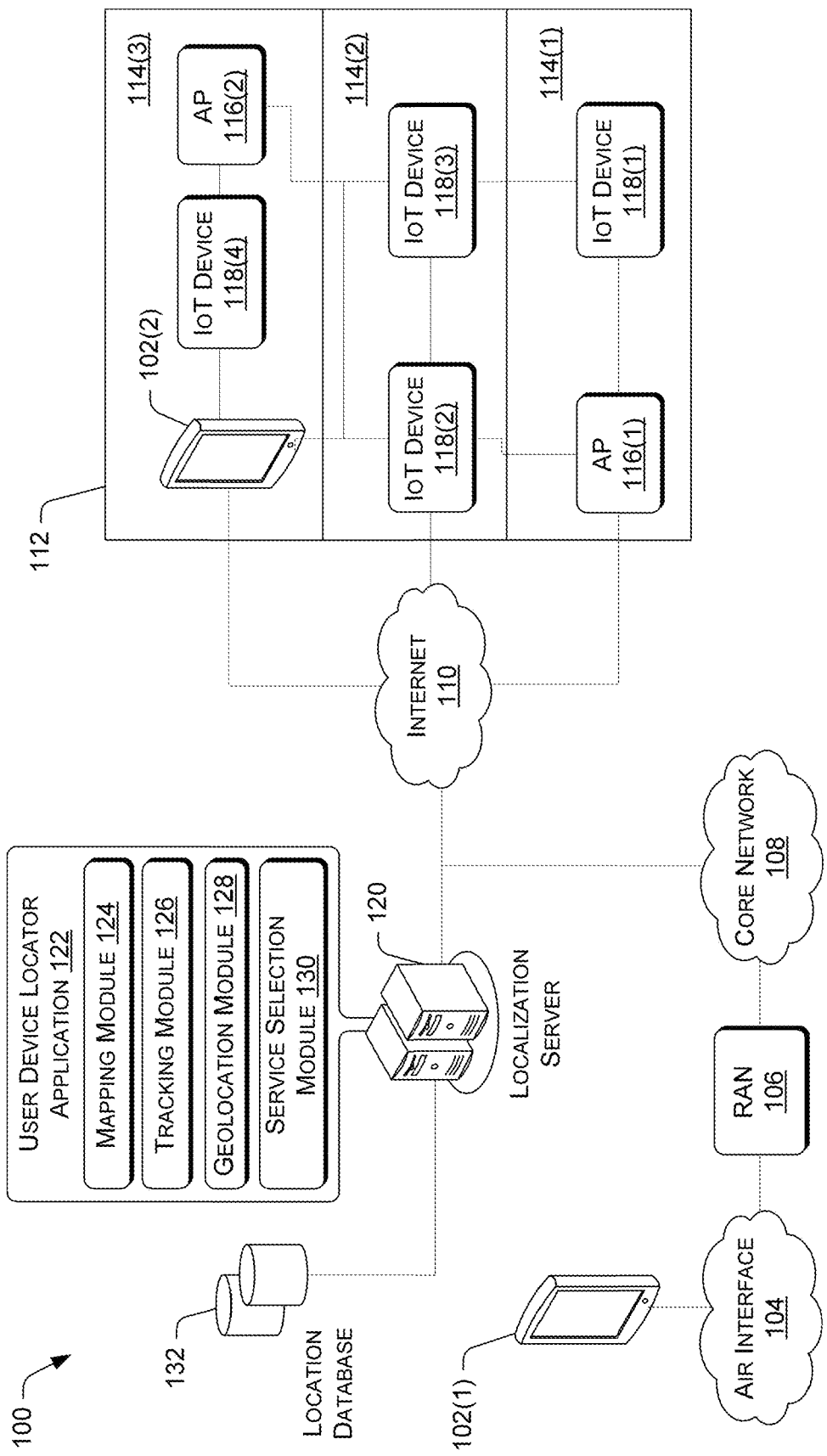
FIG. 1 illustrates an example of a network architecture for locating a user device in an indoor environment based at least on a building topology model.

This disclosure is directed to techniques for locating a user device in an indoor environment based at least on a unique building topology model. In various embodiments, an indoor environment may be a building in which one or more Internet of Things (IoT) devices are located and connected to a network. A 3D representation of the building may be provided via a 3D coordinate system (e.g., on an XYZ plane) by leveraging one or more building geometries that are generated based on the location of the individual IoT devices. In one example, a location of an IoT device may be depicted as a point with 3D coordinates (i.e., XYZ coordinates).

The locations of the individual IoT devices in the building may be recorded at a location server and mapped to determine the spatial relationship among the one or more IoT devices. The spatial relationship among the IoT devices may be indicative of a building geometry of the building. The building geometry of the building may be representative of various parts (e.g., interior, exterior, boundary, sections, rooms, hallways, corridors, staircase, elevator shaft, floor levels, etc.) of the building. One or more building geometries of the building may be combined to produce the building topology model. In some examples, building blueprints or floor plans may be provided from an open source to provide a 3D representation of the building. The building blueprints may include vector coordinates of a building plan, elevation, and/or section where the individual vector coordinates may be associated with a magnitude, direction, an initial node, a terminal node, and corresponding GPS locations.

The location server may be configured to detect a presence of a user device in the building. For instance, the user device may establish communication with one or more IoT devices in the building. Additionally, or alternatively, the location server may determine that the user device is located inside the building based at least on the user device's measured signals (e.g., Received Signal Strength Indicator (RSSI), Reference Signal Received Power (RSRP), Time of Arrival (ToA), Angle of Arrival (AoA), Angle of Departure (AoD), etc.) from one or more IoT devices or other signal sources such as access points in the building. The location server may identify the IoT devices with which the user device is communicating. Based on the identity of the IoT devices, the location server may identify the building and obtain a building topology model that is associated with the building. Additionally, the location server may determine the location of the IoT device based at least on signal measurements and the user device relative to the location of the IoT device. In one example, the location server may determine a point with 3D coordinates that corresponds to the location of the user device in the building. Upon determining the location of the user device, the location server may map the location of the user device based at least on the building topology model.

Because the building topology model is uniquely associated with a building and based on one or more building geometries that represent the spatial relationship among one or more IoT devices that are located within the building, localization of user devices that communicate with the IoT devices is more accurate. Additionally, the location server need not rely on the installation and implementation of costly infrastructure to improve indoor localization. The techniques described herein may be implemented in a number of ways. Example implementations are provided below with reference to the following figures.

Example Network Architecture

FIG. 1 illustrates an example of a network architecture for locating a user device in an indoor environment based at least on a building topology model. The network 100 includes one or more user devices 102(1) and 102(2). The user devices 102(1) and 102(2) may be smartphones, mobile devices, personal digital assistants (PDAs), or other electronic devices having a wireless communication function, that are capable of receiving input, processing the input, and generating output data.

The user devices 102(1) and 102(2) are configured to communicate with a telecommunication network via an access network over a physical communications interface or layer, shown in FIG. 1 as air interfaces 104 and/or a direct-wired connection. The air interface 104 can comply with a given cellular communications protocol (e.g., CDMA, EVDO, eHRPD, GSM, EDGE, W-CDMA, LTE, etc.). In other embodiments, an additional air interface can comply with a wireless Internet Protocol (e.g., Wi-Fi, IEEE 802.11). The access network may comprise a RAN 106 which includes a plurality of access points that serve user devices over air interfaces, such as the air interface 104. The access points in the RAN 106 can be referred to as access nodes (ANs), access points (APs), and base stations (BSs, Node Bs, eNode Bs, gNb, etc.). These access points can be terrestrial access points (or ground stations), or satellite access points.

The RAN 106 is configured to connect to a core network 108 that can perform a variety of functions and support one or more communication services, including bridging circuit-switched (CS) calls between user devices served by the RAN 106 and other user devices served by a different RAN, and can also mediate an exchange of packet-switched (PS) data with external networks such as Internet 110. The Internet 110 includes a number of routing agents and processing agents (not shown). In FIG. 1, the user device 102(2) is shown as connecting to the Internet 110 directly (i.e., separate from the core network 108, such as over an Ethernet connection of a Wi-Fi or an 802.11-based network). The Internet 110 can thereby function to bridge packet-switched data communications between the user device 102(1) and the user device 102(2) via the core network 108.

The user devices 102(1) and 102(2) may operate in a variety of environments. In FIG. 1, the user device 102(2) is located in an indoor environment such as a building 112. The building 112 may be a commercial or residential property with multiple levels 114(1)-114(3). One or more access points 116(1) and 116(2) may be located throughout the building 112. The access points 116(1) and 116(2) may be separate from the RAN 106. The access points 116(1) and 116(2) may be connected to the Internet 110 independent of the core network 108 (e.g., via an optical communication system such as FiOS, a cable modem, etc.). Additionally, while the user device 102(2) in FIG. 1 may depict a smartphone, the user device 102(2) may also be a laptop or other computing devices with a direct wired connection to the Internet 110, such as a direct connection to a modem or router, which can correspond to the access point 130(1) (e.g., for a Wi-Fi router with both wired and wireless connectivity).

The access points 116(1) and 116(2) may be connected to one or more Internet of Things (IoT) devices 118(1)-118(4). The IoT devices 118(1)-118(4) may include devices with embedded sensors (e.g., thermostats, lights, cameras, etc.), smart appliances, industrial equipment, medical devices, and/or other types of electronic devices that are capable of communicating with a network. One or more of the IoT devices 118(1)-118(4) may be strategically located at a point of ingress and egress (e.g., entrances, exits, etc.) or other areas of interest (e.g., elevators, kiosks, etc.) in the building 112. The points of ingress and egress or other areas of interests may be designated as a reference point. The IoT devices 118(1)-118(4) are associated with device attributes. The device attributes may include a device identifier, location data, and/or device status. The device identifier can include a device serial number, MAC address, or the like. In some aspects, one or more of the IoT devices 118(1)-118(4) may also be identifiable via a group identifier corresponding to a set of identifiers associated with the respective group of IoT devices. In one example, IoT devices on the ground floor 114(1) may be grouped together, IoT devices on the second floor 114(2) may be grouped together, and IoT devices on the top floor 114(3) may be grouped together. In other examples, the IoT devices 118(1)-118(4) may be grouped by type, users, categories, locations, zones, and/or so forth. The device identifier of the IoT device may be associated with the identity of the building 112. In FIG. 1, as the user device 102(2) moves within the building 112, the user device 102(2) may communicate with the one or more IoT devices 118(1)-118(4).

The access points 116(1) and 116(2) may register the IoT devices 118(1)-118(4) with the location server 120, which then enables the IoT devices 118(1)-118(4) to communicate with the location server 120. In one example, the individual IoT devices 118(1)-118(4) may communicate its device status to the location server 120. The device status may indicate whether the one or more IoT devices 118(1)-118(4) are active, malfunctioning, in repair, offline, or decommissioned. In some aspects, the IoT devices 118(1)-118(4) may also report to the location server 120, information associated with one or more user devices (e.g., user device identifier, usage information, etc.) that are connected to the IoT devices 118(1)-118(4). The IoT devices 118(1)-118(4) may report to the location server 120 on a scheduled basis or in response to receiving a query from the location server 120.

The location server 120 is configured to support indoor geolocation functions to locate the user devices 102(1) and 102(2). The location server 120 may include a user device locator application 122. The user device locator application 122 may be executable via one or more hardware, software, or communication environments, each of which enables the location server 120 to use the location of the IoT devices 118(1)-118(4) to determine a building geometry and generate a building topology model based on the building geometry. The location server 120 may determine the location of the user devices 102(1) and 102(2) when the user devices 102(1) and 102(2) are in the building 112. In the illustrated embodiment, the location server 120 may locate the user device 102(2) and map the location of the user device 102(2) within the building 112 based at least on the building topology model.

The user device locator application 122 may include a mapping module 124, a tracking module 126, a geolocation module 128, and a service selection module 130. The mapping module 124 may be configured to identify the location of the registered IoT devices 118(1)-118(4) within a 3D representation of the building 112. In some aspects, the mapping module 124 may access building blueprints or floor plans of the building 112 from a database such as a location database 132. The location database 132 can comprise a data management layer that includes software utilities for facilitating the acquisition, processing, storing, reporting, and analysis of data from multiple data sources. In one example, the data sources can include a platform for open source projects or a repository that provide building information and data, and/or so forth. The location database 132 may be a part of a distributed storage system, in which data may be stored for long periods and replicated to guarantee reliability.

The mapping module 124 may identify the building 112 based at least on the identification of the registered IoT devices 118(1)-118(4) that are associated with the building 112. In some examples, the mapping module 124 may implement a 3D coordinate system such as a 3D Cartesian coordinate system. The mapping module 124 may identify the locations of the individual IoT devices 118(1)-118(4) that correspond to points with 3D coordinates. The mapping module 124 may implement various techniques such as a trilateration method to determine the locations of the individual IoT devices 118(1)-118(4) by deploying probing devices that can measure signals from the IoT devices 118(1)-118(4). In such a scenario, the 3D position of the IoT devices 118(1)-118(4) may be calculated. The calculated 3D position of the IoT devices 118(1)-118(4) may be correlated with known GPS locations of probing devices, GPS locations of the vector coordinates of the building plan, elevation, or section. For example, a GPS location or position may include a longitude coordinate, a latitude coordinate, and an elevation above sea level. The locations of the IoT devices 118(1)-118(4) may be stored in the location database 132. The location server 120 may also store device data and other information related to the IoT devices 118(1)-118(4) in the location database 132. The mapping module 124 may anchor the individual IoT devices 118(1)-118(4) to their individual known locations in the building 112. Based at least on the locations of the IoT devices 118(1)-118(4), the mapping module 124 may generate one or more building geometries of the building 112. The building geometries may be generated on a floor-by-floor or section-by-section basis. For instance, the mapping module 124 may generate a building geometry that corresponds to the ground floor 114(1) of the building 112 upon locating the IoT devices (e.g., IoT device 118(1)) that are located on the ground floor 114(1) of the building 112. One or more building geometries of the building 112 may be combined to generate a building topology model.

Over time, the location of the one or more IoT devices 118(1)-118(4) may change. The tracking module 126 may be configured to track the location of the IoT devices 118(1)-118(4). In one example, the tracking module 126 may update the location of the IoT devices 118(1)-118(4) to re-anchor the location of the individual IoT devices 118(1)-118(4) to its new location in the building 112. Re-anchoring of the location of the individual IoT devices 118(1)-118(4), may trigger the mapping module 124 to update the building geometry and the building topology model. In some aspects, the tracking module 126 may also be configured to track the location of the user devices 102(1) and 102(2) over a period of time. For example, the user devices' 102(1) and 102(2) location information may be timestamped to record the user devices' 102(1) and 102(2) location history and movement pattern. The location history of the IoT devices 118(1)-118(4) and the user devices 102(1) and 102(2) may be stored in the location database 132.

The geolocation module 128 may be configured to identify the location of a user device 102(2) relative to the one or more IoT devices 118(1)-118(4) in the building 112. In FIG. 1, the geolocation module 128 may receive a request to locate the user device 102(2) in the building 112. The geolocation module 128 may identify the IoT devices 118(2) and 118(4) that are connected to the user device 102(2). Based at least on the location of the connected IoT devices 118(2) and 118(4), the geolocation module 128 may determine the location of the user device 102(2). In some examples, the geolocation module 128 may calculate the distance between the user device 102(2) and the IoT devices 118(2) and 118(4) using signal measurements from the IoT devices 118(2) and 118(4) and/or other data such as sensor data from the IoT devices 118(2) and 118(4) and/or the user device 102(2). For instance, the approximate position of the user device may be determined based on signal strength triangulation based on received signal measurements of the IoT devices, trigonometry-based location calculation based on the known positions of the IoT devices, and/or so forth. In response to determining the location of the user device 102(2), the mapping module 124 may determine the 3D coordinates of the user device 102(2) and map the approximate location of the user device 102(2) in the building 112 based at least on the building topology model.

In some aspects, the geolocation module 128 may be configured to transmit the location of the user device 102(2) in response to a triggering event. For example, the user device 102(2) may receive input from a user indicating a state of emergency. In other examples, the user device 102(2) may receive emergency and government alerts or public safety notifications. In response to the triggering event, the geolocation module 128 may transmit the location of the user device to first responders, emergency services, and/or authorities. The geolocation module 128 may also transmit the location of the user device 102(2) to an additional device that is associated with an emergency contact in an address book that is stored in or accessible via the user device 102(2).

The service selection module 130 may be configured to provide recommendations for nearby amenities and products based at least on the location of the user device 102(2). For example, the service selection module 130 may provide recommendations for nearby restaurants and shops that are located within the building 112. The service selection module 130 may filter recommendation by type of amenities and products offered by various businesses. Additionally, the service selection module 130 may filter recommendation by proximity and other parameters and preferences as set by the user of the user device 102(2). The recommendations may be displayed on the user device 102(2) via a mobile application such as a navigation application, a retail application, and/or other types of applications that may provide a notification function. In some aspects, the service selection module 130 may implement a navigation application to route the user device 102(2) from a starting position to the desired destination.

Figure 2:
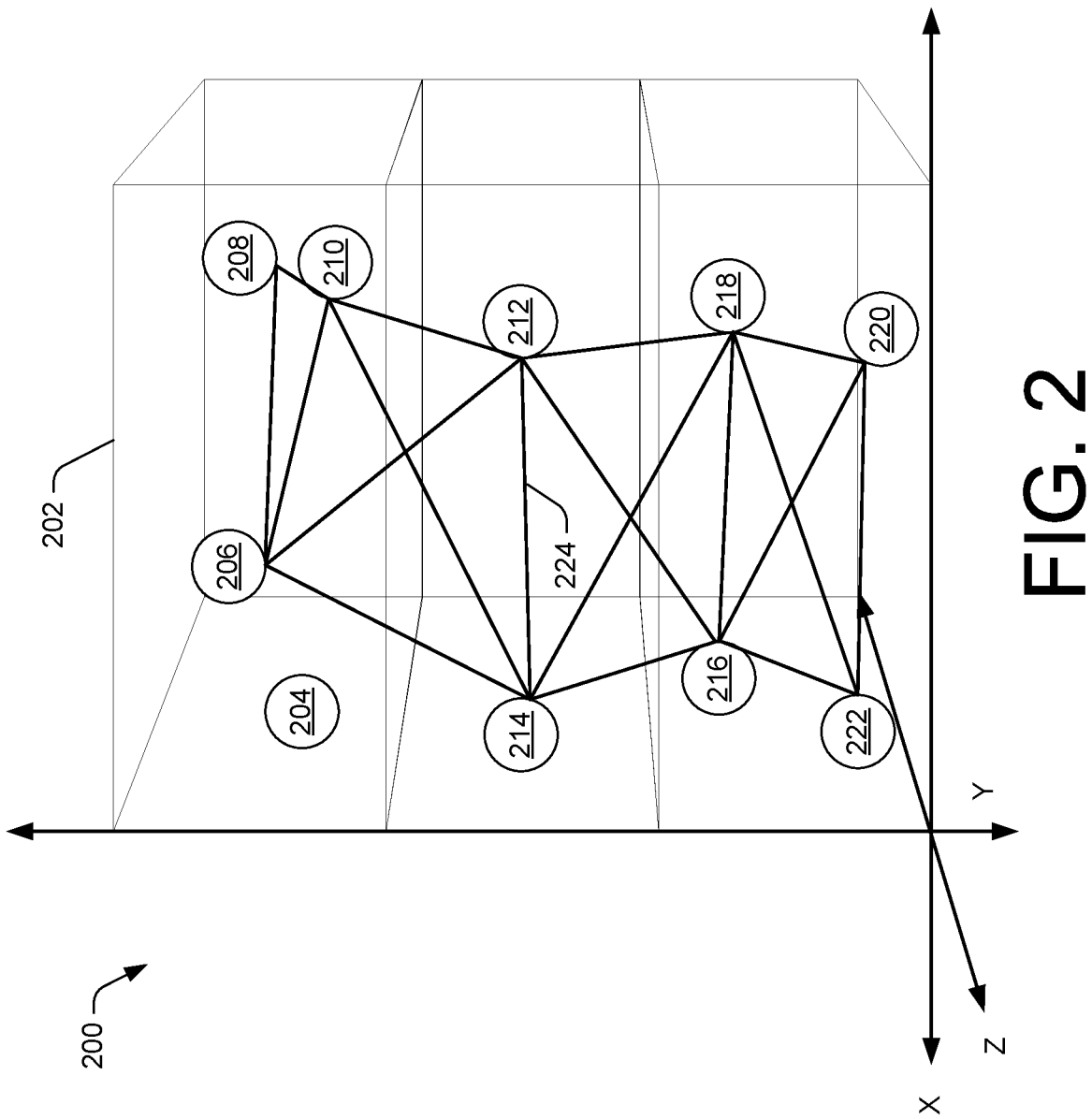
FIG. 2 is a detailed three-dimensional (3D) view of an indoor environment for which a building topology model is generated using indoor geolocation.

FIG. 2 is a detailed 3D representation of a building 200 on an XYZ plane. The building 200 may correspond to the building 112 of FIG. 1. Accordingly, the building 200 includes a ground floor, a second floor, and a top floor. In other examples, the building 200 may comprise fewer or more floors and/or other architectural or structural features (e.g., below-ground levels, garages, skybridges, etc.). Additionally, the building 200 may include a combination of indoor and outdoor environments such as a building with a courtyard or a shopping center and other indoor/outdoor spaces. In the illustrated embodiment, the user device 204 may be located on the top floor of the building 200.

The user device 204 may be in communication with one or more of the IoT devices 206-222 that are located throughout the building 200. In FIG. 2, the IoT devices 206-210 are located on the top floor of the building 200. The IoT devices 212-214 are located on the second floor of the building 200. The IoT devices 216-222 are located on the ground floor of the building 200. Additionally, the IoT devices 206-222 may comprise a variety of IoT devices. Accordingly, the first IoT device 206 and the second IoT device 208 may comprise different types of devices.

The location of the individual IoT devices 206-222 may correspond to 3D coordinates within the boundaries of the building 200. For instance, the first IoT device 206 may be located at ($X_1$, Y1, $Z_1$), the second IoT device 208 may be located at ($X_2$, Y2, $Z_2$), the third IoT device 210 may be located at ($X_3$, Y3, $Z_3$), and so on. The 3D coordinates of the IoT devices 206-222 may be used to generate one or more building geometries 224 via a location server. The building geometries 224 may be updated as additional IoT devices 206-222 are placed in the building 200. For instance, a building geometry may initially depict only a part of the building 200 when the IoT devices 216-222 on the ground floor are located. As the IoT devices 212 and 214 on the second floor and the IoT devices 206-210 on the top floor are located, the building geometry may be updated, or a new building geometry may be generated. The updated building geometry or the new building geometry may indicate that the building 200 may include multiple levels. Accordingly, the building geometries and other spatial data from each floor of the building 200 may be layered to determine the building topology model 202 that represents the building 200. Similarly, the building geometries 224 may be updated as the IoT devices 206-222 move to different locations and the IoT devices 206-222 are associated with different 3D coordinates.

The distances between the IoT devices 206-222 may also be indicative of building 200 dimensions. For instance, the horizontal distance along the X-axis between the first IoT device 206 and the second IoT device 208 ($X_{length}=X_1-X_2$) located at or near opposing walls of the top floor may indicate the approximate length of the top floor. Similarly, the horizontal distance along the Z-axis between the first IoT device 206 and the second IoT device 208 ($Z_{width}=Z_1-Z_2$) may indicate the approximate width of the top floor. The vertical distance along the Y-axis between the second IoT device 208 that is mounted near the ceiling and the third IoT device 210 ($Y_{height}=Y_2-Y_3$) that is located near the floor may indicate the approximate height of the top floor. Similarly, the vertical distance along the Y-axis between the IoT device 206 on the top floor and the IoT device 222 ($Y_{b-height}=Y_1-Y_n$) on the ground floor may indicate the approximate overall height of the building 200.

Because the IoT devices 206-222 are associated with the building 200 and the individual IoT devices 206-222 are anchored to a specific location within the building 200, the building geometries 224 and the building topology model 202 generated therefrom are unique to the building 200. Accordingly, the building topology model 202 may be distinct from another building topology model of another building even if that building is structurally identical to the building 200 of FIG. 2. The building topology model 202 may depict various architectural or structural features of the building 200. For example, the building topology model 202 may show defined interior hallways, rooms, spaces, and other features that may be shown on building blueprints or floor plans. In some aspects, the user device 204 may be located relative to the location of one or more of the IoT devices 206-222. The approximate location of the user device 204 may correspond to a point with 3D coordinates. Based at least on the 3D coordinates of the user device 204, the location server may map the location of the user device 204 and identify the floor, room, hallway, and/or other parts of the building 200 where the user device 204 is located.

Example Computing Device Components

Figure 3:
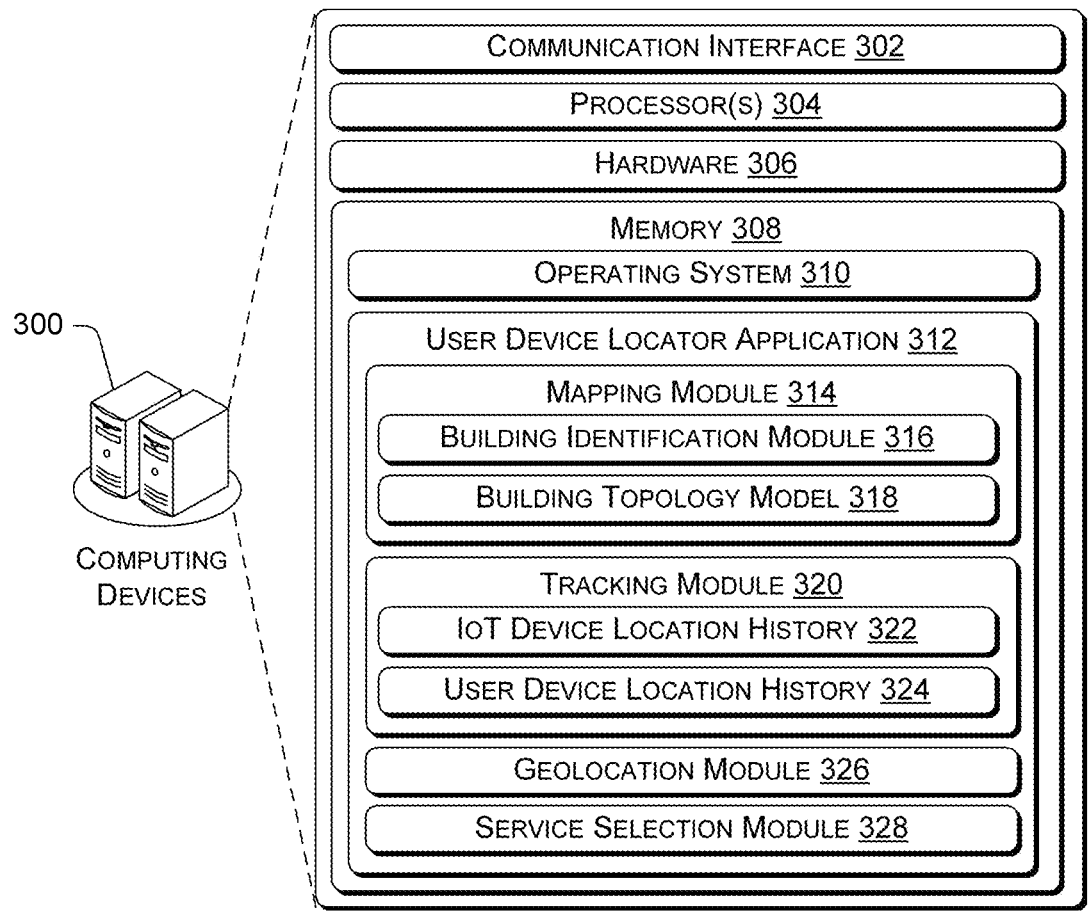
FIG. 3 is a block diagram showing various components of an illustrative computing device that implements indoor geolocation.

FIG. 3 is a block diagram showing various components of illustrative computing devices 300, wherein the computing device can comprise a location server. It is noted that the computing devices 300 as described herein can operate with more or fewer of the components shown herein. Additionally, the computing devices 300 as shown herein or portions thereof can serve as a representation of one or more of the computing devices such as the location server of the present system.

The computing devices 300 may include a communication interface 302, one or more processors 304, hardware 306, and memory 308. The communication interface 302 may include wireless and/or wired communication components that enable the computing devices 300 to transmit data to and receive data from other networked devices. In at least one example, the one or more processor(s) 304 may be a central processing unit(s) (CPU), graphics processing unit(s) (GPU), both a CPU and GPU or any other sort of processing unit(s). Each of the one or more processor(s) 304 may have numerous arithmetic logic units (ALUs) that perform arithmetic and logical operations as well as one or more control units (CUs) that extract instructions and store content from processor cache memory, and then execute these instructions by calling on the ALUs, as necessary during program execution.

The one or more processor(s) 304 may also be responsible for executing all computer applications stored in the memory, which can be associated with common types of volatile (RAM) and/or nonvolatile (ROM) memory. The hardware 306 may include an additional user interface, data communication, or data storage hardware. For example, the user interfaces may include a data output device (e.g., visual display, audio speakers), and one or more data input devices. The data input devices may include but are not limited to, combinations of one or more keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the computing devices 300.

The processor(s) 304 and the memory 308 of the computing devices 300 may implement an operating system 310 and a user device locator application 312. The operating system 310 may include components that enable the computing devices 300 to receive and transmit data via various interfaces (e.g., user controls, communication interface, and/or memory input/output devices), as well as process data using the processor(s) 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The user device locator application 312 may include routines, program instructions, objects, and/or data structures that perform particular tasks or implement particular abstract data types. For example, the user device locator application 312 may include one or more instructions which, when executed by the one or more processors 304, direct the computing devices 300 to perform operations related to locate a user device in an indoor environment such as a building based at least on a building topology model that is associated with the building. In some aspects, the user device locator application 312 includes one or more modules such as a mapping module 314, a tracking module 320, a geolocation module 326, and a service selection module 328.

The mapping module 314 may include one or more instructions, which, when executed by the one or more processors 304, direct the computing devices 300 to perform operations related to identifying and mapping IoT devices within the building. In one example, the mapping module 314 may implement a building identification module 316 to identify a particular building based at least on the identification of the registered IoT devices that are associated with the building. In some aspects, the mapping module 314 may access building blueprints, floor plans, and/or other building data that is associated with the building from a database. The building identification module 316 may also associate the building with a unique building identifier and other information such as the address of the building. In some examples, the mapping module may render a 3D representation of a building using a 3D coordinate system (e.g., 3D Cartesian coordinate system) and locate the registered IoT devices via points corresponding to 3D coordinates.

The mapping module 314 may receive communications from one or more IoT devices. The communications may include the IoT device's identification information, location information, and/or its device status. In some examples, the communications may also include identities of user devices (e.g., international mobile equipment identity [IMEI] number) that are connected to the IoT devices. In some examples, the mapping module 314 may also determine the location of the IoT devices based at least on signal measurements from the IoT devices that are measured via one or more probing devices. A 3D position of an IoT device may be calculated using a trilateration method or other suitable techniques, depending upon embodiments.

Based at least on the location of the IoT devices, the mapping module 314 may generate one or more building geometries that depict at least a part of the building. In one example, the mapping module 314 may connect the points with 3D coordinates that correspond to the location of the IoT devices. The points may be connected from different angles to generate 2D surface geometries or 3D geometries from different perspectives of the building. The building geometries may be constructed on a floor-by-floor or section-by-section basis. Based on at least 3D coordinates corresponding to the points, the mapping module 314 may identify IoT devices that are located in the same general area of the building. For instance, the mapping module 314 may determine that a first IoT device and a second IoT device are located on the same floor when the first IoT device is located at $(X_1, Y_1, Z_1)$ and the second IoT device is located at $(X_2, Y_2, Z_2)$ and $Y_1=Y_2$.

The mapping module 314 may generate a building topology model 318 based at least on the building geometries. The building topology model 318 may be a combination of one or more 2D or 3D building geometries. The mapping module 314 may be configured to identify or select an anchor point that corresponds to the location of an IoT device. The anchor point may be used to determine a desired perspective of the building topology model. In some aspects, the mapping module 314 may correct distortions in the building topology model. For instance, the mapping module 314 may generate a building topology model with a solid bottom surface even if only one point corresponding to a location of an IoT device is mapped on the ground floor.

The tracking module 320 may include one or more instructions, which, when executed by the one or more processors 304, direct the computing devices 300 to perform operations related to tracking the location of IoT devices and user devices within a building. For example, the location of one or more IoT devices may change. The tracking module 320 may be configured to track the location of the IoT devices and log the IoT device location history 322. In one example, the tracking module 320 may update the location of the IoT devices. Updating the location of the individual IoT devices may trigger the mapping module 314 to update the mapping of the IoT devices within the building. Additionally, the mapping module 314 may in turn update the building geometries and the building topology model 318.

Similarly, the tracking module 320 may be configured to track the location of the user devices within a building and log the user device location history 324. The location history of the user device may be used to detect a movement pattern of the user device. For instance, the user device location history 324 may indicate that a user device is located in a particular room on a top floor during work hours on weekdays. Accordingly, the tracking module 320 may associate such location as a place of work of a user of the user device.

The geolocation module 326 may include one or more instructions, which, when executed by one or more processors 304, direct the computing devices 300 to perform operations related to identify the location of a user device relative to the one or more IoT devices in the building. The geolocation module 326 may receive a request to locate the user device in the building. The geolocation module 326 may identify the IoT devices that are connected to the user device. Based at least on the location of the connected IoT devices, the geolocation module 326 may determine the location of the user device.

In one example, the geolocation module 326 may receive signal measurements from an IoT device to determine a distance between the user device and the IoT device. In other examples, the geolocation module 326 may receive sensor data from an IoT device and/or the user device that is indicative of the user device's position relative to the IoT device. In some aspects, different sensor data from multiple IoT devices in communication with the user device may be analyzed to determine the approximate location of the user device. For instance, the approximate position of the user device may be determined based on signal strength triangulation based on received signal measurements of the IoT devices, trigonometry-based location calculation based on the known positions of the IoT devices, and/or so forth. In response to determining the location of the user device, the geolocation module 326 may trigger the mapping module 314 to map a point with 3D coordinates that correspond to the location of the user device.

The service selection module 328 may include one or more instructions, which, when executed by the one or more processors 304, direct the computing devices 300 to perform operations related to providing recommendations for nearby amenities and products based at least on the location of the user device. The service selection module 328 may obtain building information such as a building directory from a database and provide recommendations for nearby restaurants and shops that are located within the building. For example, the database may include building directory information that is maintained by the communication network and/or building directory information that is retrieved from third-party data sources. In some aspects, the recommendations may be displayed on the user device via a mobile or a web application such as a navigation application, a retail application, and/or other types of applications that may provide a user interface for displaying notifications and alerts. In some aspects, the service selection module 328 may implement a navigation application to route the user device from a starting position to a desired destination within the building. For example, the service selection module 328 may direct a user of the user device to an emergency exit and service kiosks.

Example Processes

Figure 4:
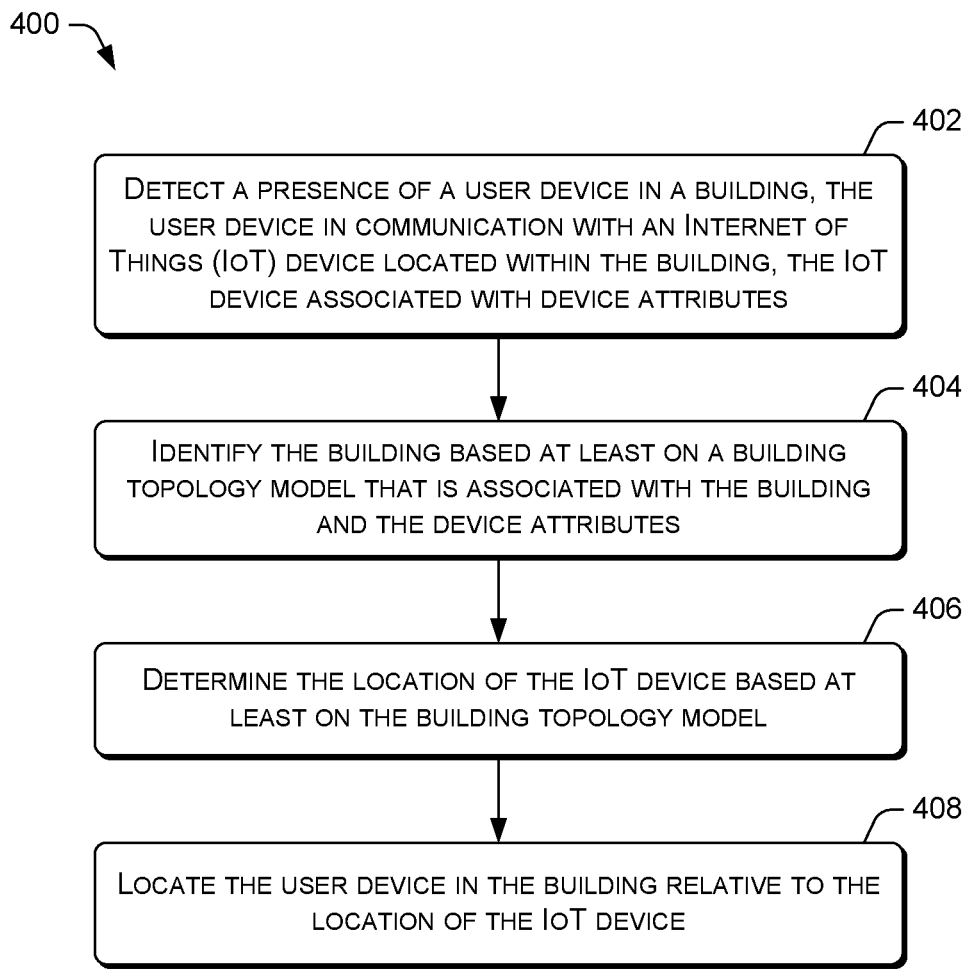
FIG. 4 is a flow diagram of an example process for performing indoor geolocation-based at least on a building topology model.
Figure 5:
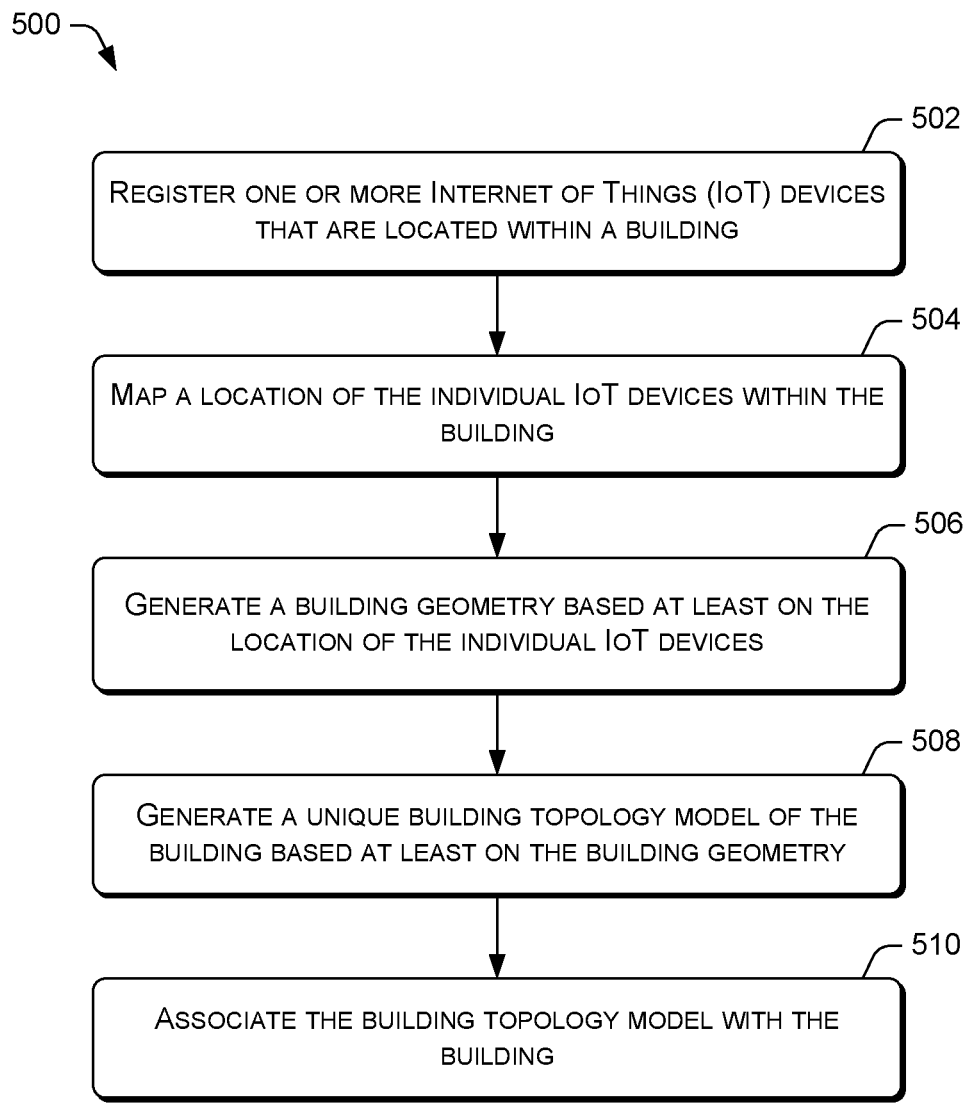
FIG. 5 is a flow diagram of an example process for generating a building topology model of an indoor environment.

FIGS. 4 and 5 presents an illustrative process 400 and 500 for indoor geolocation. The processes 400 and 500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, processes 400 and 500 are described with reference to FIGS. 1 through 3.

FIG. 4 is a flow diagram of an example process 400 for performing indoor geolocation-based at least on a building topology model. At block 402, a location server may detect a presence of a user device in a building. The user device may be in communication with an Internet of Things (IoT) device that is located within the building. The IoT device may be associated with one or more device attributes. In various embodiments, the device attributes may include a device identifier that is associated with the IoT device, the location of the IoT device, and the status of the IoT device.

At block 404, the location server may identify the building based at least on a building topology model that is associated with the building and the device attributes. Accordingly, the IoT device is unique to the building. The building topology model may represent various architectural or structural features of the building. Additionally, the building topology model may be rendered via a 3D coordinate system. At block 406, the location server may determine the location of the IoT device based at least on the building topology model. The location of the IoT device may correspond to a point with 3D coordinates. At block 408, the location server may locate the user device in the building relative to the location of the IoT device. In one example, the location of the user device may correspond to an additional point that corresponds to additional 3D coordinates.

FIG. 5 is a flow diagram of an example process 500 for generating a building topology model of an indoor environment. At block 502, one or more Internet of Things (IoT) devices may be registered at a location server. The IoT devices may be located within a building and associated with one or more device attributes. The device attributes may be provided to the location server during the registration process. At block 504, the location server may map the location of the individual IoT devices within the building. In one example, the location of the IoT devices may correspond to a point with 3D coordinates.

At block 506, the location server may generate a building geometry based at least on the location of the individual IoT devices. In one example, the location server may connect the points that correspond to 3D coordinates to construct the building geometry. The building geometry may change as additional IoT devices are registered or the IoT devices are moved to different locations within the building. Additionally, or alternatively, additional building geometries may be generated as additional IoT devices are registered or the IoT devices are moved to different locations. At block 508, the location server may generate a unique building topology model of the building based at least on the building geometry. In one example, the location server may combine one or more building geometries. Additionally, the location server may select an anchor point that corresponds to at least one of the IoT devices to determine a desired perspective of the building topology model. At block 510, the location server may associate the building topology model with the building. The building topology model may include architectural or structural features that may be shown on a building blueprint or floor plan.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

controlling probing devices to measure signal strengths from a plurality of Internet of Things (IoT) devices in and associated with a building that has a building identifier and an address;

accessing global positioning system (GPS) locations of the probing devices;

based on the GPS locations of the probing devices and the signal strengths measured by the probing devices, determining locations of the plurality of IoT devices;

based on the locations of the plurality of IoT devices, generating building geometries that are representative of various parts of the building including an interior, an exterior, boundaries, sections, rooms, hallways, corridors, staircases, elevator shafts, or floor levels;

selecting a location of an IoT device of the plurality of IoT devices as an anchor point location for a building topology model;
generating the building topology model using the building geometries and from a perspective of the anchor point location;
determining that an additional IoT device is located in the building;
controlling the probing devices to measure an additional signal strength from the additional IoT device;
based on the GPS locations of the probing devices and the additional signal strength measured by the probing devices, determining an additional location of the additional IoT device;
based on the additional location of the additional IoT device, generating additional building geometries that are representative of other parts of the building not included in the various parts of the building;
generating an updated building topology model using the building geometries and the additional building geometries and from the perspective of the anchor point location;
detecting a presence of a user device in the building;
identifying a subset of IoT devices of the plurality of IoT devices and the additional IoT device with which the user device is communicating;
receiving signal strength measurements from the subset of IoT devices based on communications between the subset of IoT devices and the user device;
receiving sensor data from the subset of IoT devices and the user device;
determining a location of the user device based on (i) signal strength triangulation of the signal strength measurements from the subset of IoT devices, (ii) the sensor data, (iii) the additional location of the additional IoT device, and (iv) the locations of the IoT devices; and
based on the location of the user device, determining coordinates of the user device in the updated building topology model.

2. The one or more non-transitory computer-readable media of claim 1, wherein the acts further comprise:
detecting a change in the locations of the plurality of IoT devices in the building;
determining a new location of at least one IoT device of the plurality of IoT devices in the building in accordance with the change;
mapping the new location of the at least one IoT device in the building;
generating one or more new building geometries based at least on the new location of the at least one IoT device; and
generating a new building topology model based at least on the one or more new building geometries.

3. The one or more non-transitory computer-readable media of claim 1, wherein the acts further comprise:
removing an IoT device of the plurality of IoT devices;
generating one or more updated building geometries based at least on the removal; and
generating an updated building topology model based at least on the one or more updated building geometries.

4. The one or more non-transitory computer-readable media of claim 1, wherein the plurality of IoT devices include device attributes that comprise, respectively, at least one of a device identifier, 3D coordinates of the IoT device, and device status.

5. The one or more non-transitory computer-readable media of claim 1, wherein the plurality of IoT devices are associated with a point of ingress or egress of the building.

6. The one or more non-transitory computer-readable media of claim 1, wherein the acts further comprise:
recommending amenities and products based at least on the location of the user device.

7. A computer-implemented method, comprising:
controlling probing devices to measure signal strengths from a plurality of Internet of Things (IoT) devices in and associated with a building that has a building identifier and an address;
accessing global positioning system (GPS) locations of the probing devices;
based on the GPS locations of the probing devices and the signal strengths measured by the probing devices, determining locations of the plurality of IoT devices;
based on the locations of the plurality of IoT devices, generating building geometries that are representative of various parts of the building including an interior, an exterior, boundaries, sections, rooms, hallways, corridors, staircases, elevator shafts, or floor levels;
selecting a location of an IoT device of the plurality of IoT devices as an anchor point location for a building topology model;
generating the building topology model using the building geometries and from a perspective of the anchor point location;
determining that an additional IoT device is located in the building;
controlling the probing devices to measure an additional signal strength from the additional IoT device;
based on the GPS locations of the probing devices and the additional signal strength measured by the probing devices, determining an additional location of the additional IoT device;
based on the additional location of the additional IoT device, generating additional building geometries that are representative of other parts of the building not included in the various parts of the building;
generating an updated building topology model using the building geometries and the additional building geometries and from the perspective of the anchor point location;
detecting a presence of a user device in the building;
identifying a subset of IoT devices of the plurality of IoT devices and the additional IoT device with which the user device is communicating;
receiving signal strength measurements from the subset of IoT devices based on communications between the subset of IoT devices and the user device;
receiving sensor data from the subset of IoT devices and the user device;
determining a location of the user device based on (i) signal strength triangulation of the signal strength measurements from the subset of IoT devices, (ii) the sensor data, (iii) the additional location of the additional IoT device, and (iv) the locations of the IoT devices; and
based on the location of the user device, determining coordinates of the user device in the updated building topology model.

8. The computer-implemented method of claim 7, further comprising:
detecting a change in the locations of the plurality of IoT devices in the building;

determining a new location of at least one IoT device of the plurality of IoT devices in the building in accordance with the change;

mapping the new location of the at least one IoT device in the building;

generating one or more new building geometries based at least on the new location of the at least one IoT device; and generating a new building topology model based at least on the one or more new building geometries.

9. The computer-implemented method of claim 7, further comprising:

removing an IoT device of the plurality of IoT devices;

generating one or more updated building geometries based at least on the removal; and generating an updated building topology model based at least on the one or more updated building geometries.

10. The computer-implemented method of claim 7, wherein the plurality of IoT devices include device attributes that comprise, respectively, at least one of a device identifier, 3D coordinates of the IoT device, and device status.

11. The computer-implemented method of claim 7, wherein the plurality of IoT devices are associated with a point of ingress or egress of the building.

12. The computer-implemented method of claim 7, further comprising:

recommending amenities and products based at least on the location of the user device.

13. A system, comprising:

one or more non-transitory storage mediums configured to provide stored computer-readable instructions, the one or more non-transitory storage mediums coupled to one or more processors, the one or more processors configured to execute the computer-readable instructions to cause the one or more processors to:

measure signal strengths from a plurality of Internet of Things (IoT) devices in and associated with a building that has a building identifier and an address;

based on the signal strengths, determine locations of the plurality of IoT devices;

based on the locations of the plurality of IoT devices, generate building geometries that are representative of various parts of the building including an interior, an exterior, boundaries, sections, rooms, hallways, corridors, staircases, elevator shafts, or floor levels;

select a location of an IoT device of the plurality of IoT devices as an anchor point location for a building topology model;

generate the building topology model using the building geometries and from a perspective of the anchor point location;

determine that an additional IoT device is located in the building;

measure an additional signal strength from the additional IoT device;

based on the additional signal strength, determine an additional location of the additional IoT device;

based on the additional location of the additional IoT device, generate additional building geometries that are representative of other parts of the building not included in the various parts of the building;

generate an updated building topology model using the building geometries and the additional building geometries and from the perspective of the anchor point location;

detect a presence of a user device in the building;

identify a subset of the IoT devices of the plurality of IoT devices and the additional IoT device with which the user device is communicating;

receive signal strength measurements from the subset of IoT devices based on communications between the subset of IoT devices and the user device;

receive sensor data from the subset of IoT devices and the user device;

determine a location of the user device based on (i) signal strength triangulation of the signal strength measurements from the subset of IoT devices, (ii) the sensor data, (iii) the additional location of the additional IoT device, and (iv) the locations of the IoT devices; and based on the location of the user device, determine coordinates of the user device in the updated building topology model.

14. The system of claim 13, wherein the one or more processors are further configured to:

receive a request to navigate to a point of interest;

determine a starting point based at least on the location of the user device; and generate a route from the starting point to the point of interest based at least on the updated building topology model.

15. The system of claim 13, wherein the plurality of IoT devices include device attributes that comprise, respectively, at least one of a device identifier, 3D coordinates of the IoT device, and device status.

16. The system of claim 13, wherein the one or more processors are further configured to:

receive additional sensor data from the user device;

detect a change in the location of the user device based at least on the additional sensor data;

determine whether the user device is in communication with at least one IoT device of the plurality of IoT devices;

in response to determining that the user device is in communication with the at least one IoT device of the plurality of IoT devices, determine an updated location of the user device in the building relative to the location of the at least one IoT device of the plurality of IoT devices.

17. The one or more non-transitory computer-readable media of claim 1, wherein the sensor data comprises data received from the subset of IoT devices that indicates a location of the user device relative to the subset of IoT devices.

18. The one or more non-transitory computer-readable media of claim 1, wherein generating the building topology model using the building geometries and from the perspective of the anchor point location comprises:

identifying distortions in the building topology model; and correcting the distortions in the building topology model.

19. The one or more non-transitory computer-readable media of claim 1, wherein detecting the presence of the user device in the building comprises:

receiving, from one or more IoT devices of the plurality of IoT devices, measured signals of the user device including received signal strength indicator data, reference signal received power data, time of arrival data, angle of arrival data, angle of departure data; and based on the measured signals of the user device including received signal strength indicator data, reference signal received power data, time of arrival data, angle of arrival data, angle of departure data, determining that the user device is in the building.

20. The one or more non-transitory computer-readable media of claim 1, wherein the acts further comprise:
controlling other probing devices to measure other signal strengths from a plurality of other Internet of Things (IoT) devices in and associated with another building that has a different address and that is identical to the building that has the building identifier and the address;
accessing other GPS locations of the other probing devices;
based on the other GPS locations of the other probing devices and the other signal strengths measured by the other probing devices, determining other locations of the plurality of other IoT devices;
based on the other locations of the plurality of other IoT devices, generating other building geometries that are representative of other various parts of the other building;
selecting another location of another IoT device of the plurality of other IoT devices as another anchor point location for another building topology model; and
generating, using the other building geometries, the other building topology model that is from a perspective of the other anchor point location and that is different than the building topology model of the building.

* * * * *